US008274251B2

(12) United States Patent
Yoo et al.

(10) Patent No.: US 8,274,251 B2
(45) Date of Patent: Sep. 25, 2012

(54) REFRIGERATOR, SYSTEM AND METHOD FOR DRIVING A DRAWER OF THE REFRIGERATOR

(75) Inventors: Myung Keun Yoo, Seoul (KR); Yong Hwan Eom, Seoul (KR); Hyoun Jeong Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 774 days.

(21) Appl. No.: 12/390,527

(22) Filed: Feb. 23, 2009

(65) Prior Publication Data

US 2009/0243454 A1 Oct. 1, 2009

Related U.S. Application Data

(63) Continuation-in-part of application No. PCT/KR2008/001697, filed on Mar. 26, 2008.

(51) Int. Cl.
*G05D 3/00* (2006.01)

(52) U.S. Cl. .................. 318/466; 318/646; 318/568.13; 312/319.5; 312/330.1

(58) Field of Classification Search .................. 318/466, 318/646, 568.13; 312/319.5, 330.1
See application file for complete search history.

(56) References Cited

U.S. PATENT DOCUMENTS

| | | | | |
|---|---|---|---|---|
| 5,280,227 | A | 1/1994 | Bashark | |
| 5,392,951 | A | 2/1995 | Gardner et al. | |
| 5,445,294 | A | 8/1995 | Gardner et al. | |
| 5,899,083 | A | 5/1999 | Peterson et al. | |
| 5,940,306 | A | 8/1999 | Gardner et al. | |
| 6,130,621 | A | 10/2000 | Weiss | |
| 6,751,909 | B2 * | 6/2004 | Ranaudo | 49/506 |
| 6,779,855 | B2 | 8/2004 | Hoffman | |
| 7,063,398 | B2 | 6/2006 | Hoffman | |
| 7,075,446 | B2 | 7/2006 | Schondelmaier et al. | |
| 7,197,888 | B2 * | 4/2007 | LeClear et al. | 62/186 |
| 7,282,884 | B2 | 10/2007 | Huber et al. | |
| 7,307,395 | B2 | 12/2007 | Bouamra et al. | |
| 7,407,210 | B2 | 8/2008 | Arbaugh et al. | |
| 7,484,817 | B2 | 2/2009 | Hoffman et al. | |
| 7,533,947 | B2 | 5/2009 | Kim et al. | |
| 7,587,907 | B2 | 9/2009 | Kim et al. | |
| 7,594,707 | B2 | 9/2009 | Kunkle et al. | |
| 7,602,135 | B2 * | 10/2009 | Huber et al. | 318/651 |
| 7,633,258 | B2 | 12/2009 | Huber et al. | |

(Continued)

FOREIGN PATENT DOCUMENTS

CN 2406551 A 11/2000

(Continued)

OTHER PUBLICATIONS

U.S. Office Action issued in U.S. Appl. No. 12/345,946 dated May 19, 2011.

(Continued)

*Primary Examiner* — Walter Benson
*Assistant Examiner* — Erick Glass
(74) *Attorney, Agent, or Firm* — KED & Associates, LLP

(57) ABSTRACT

A system and method for driving a drawer of a refrigerator and a refrigerator employing this system is provided. This system and method allows the drawer to substantially immediately and automatically stop when the drawer encounters an obstacle. This type of automatic control of the drawer may enhance the safe operation of the drawer, prevent injuries to users, and prevent overload and subsequent malfunction of a drive motor used to move the drawer.

11 Claims, 11 Drawing Sheets

U.S. PATENT DOCUMENTS

| | | | | |
|---|---|---|---|---|
| 7,641,707 | B2 | 1/2010 | Kang et al. | |
| 7,688,015 | B2 | 3/2010 | Wenzel et al. | |
| 7,731,314 | B2 | 6/2010 | Kim | |
| 7,784,888 | B2 | 8/2010 | Oh et al. | |
| 7,802,515 | B2 | 9/2010 | Suetsugu | |
| 7,812,561 | B2 | 10/2010 | Hagen et al. | |
| 7,859,203 | B2 | 12/2010 | Miyashita | |
| 7,868,578 | B2 | 1/2011 | Scheffknecht et al. | |
| 7,928,684 | B2 | 4/2011 | Hauer | |
| 8,067,915 | B2 | 11/2011 | Hooker et al. | |
| 8,074,468 | B2 | 12/2011 | Yoo et al. | |
| 8,169,176 | B2 | 5/2012 | Yu et al. | |
| 2001/0009360 | A1 | 7/2001 | Jin | |
| 2002/0171335 | A1 | 11/2002 | Held | |
| 2003/0078710 | A1 | 4/2003 | Li | |
| 2004/0035129 | A1 | 2/2004 | Kaiser | |
| 2004/0100165 | A1 | 5/2004 | Hoffman | |
| 2004/0100166 | A1 | 5/2004 | Hoffman | |
| 2004/0100169 | A1 | 5/2004 | Huber et al. | |
| 2004/0138843 | A1 | 7/2004 | Bouamra et al. | |
| 2005/0284113 | A1 | 12/2005 | Jang et al. | |
| 2006/0061245 | A1 | 3/2006 | Huber et al. | |
| 2006/0087207 | A1 | 4/2006 | Oh et al. | |
| 2006/0087208 | A1 | 4/2006 | Oh et al. | |
| 2006/0096304 | A1 | 5/2006 | Kim et al. | |
| 2006/0104756 | A1 | 5/2006 | Kim et al. | |
| 2006/0196198 | A1 | 9/2006 | Kim et al. | |
| 2006/0207283 | A1 | 9/2006 | Kim et al. | |
| 2006/0226749 | A1 | 10/2006 | Kim | |
| 2006/0242988 | A1 | 11/2006 | Kim et al. | |
| 2006/0261775 | A1 | 11/2006 | Huber et al. | |
| 2006/0267461 | A1 | 11/2006 | Hoffman | |
| 2007/0013274 | A1 | 1/2007 | Hoffman | |
| 2007/0170828 | A1 | 7/2007 | Hoshide et al. | |
| 2007/0256036 | A1 | 11/2007 | Johnson et al. | |
| 2008/0018215 | A1 | 1/2008 | Carden et al. | |
| 2008/0110092 | A1* | 5/2008 | Takahashi | 49/28 |
| 2008/0116777 | A1 | 5/2008 | Kappler et al. | |
| 2008/0163639 | A1 | 7/2008 | Hwang | |
| 2008/0302114 | A1 | 12/2008 | Kelly et al. | |
| 2009/0091223 | A1 | 4/2009 | Hagen et al. | |
| 2009/0102338 | A1 | 4/2009 | Wenzel et al. | |
| 2009/0160297 | A1 | 6/2009 | Anikhindi et al. | |
| 2009/0199484 | A1 | 8/2009 | Zipp | |
| 2009/0206715 | A1 | 8/2009 | Scheffknecht et al. | |
| 2009/0243454 | A1 | 10/2009 | Yoo et al. | |
| 2009/0248205 | A1 | 10/2009 | Yu et al. | |
| 2009/0248207 | A1 | 10/2009 | Yoo et al. | |
| 2009/0254221 | A1 | 10/2009 | Kang | |

FOREIGN PATENT DOCUMENTS

| | | | |
|---|---|---|---|
| CN | 1468569 | A | 1/2004 |
| EP | 0779484 | | 6/1997 |
| JP | 1990-103388 | | 4/1990 |
| JP | 1990-106686 | | 4/1990 |
| JP | 1990-136686 | | 5/1990 |
| JP | 1990-146487 | | 6/1990 |
| JP | 1991-045820 | | 2/1991 |
| JP | 07-174459 | | 7/1995 |
| JP | 1995-174459 | | 7/1995 |
| JP | 1999-094455 | | 4/1999 |
| JP | 2005-326044 | | 11/2005 |
| JP | 2006-023039 | | 1/2006 |
| JP | 2006-046741 | | 2/2006 |
| JP | 2006-046748 | | 2/2006 |
| JP | 2006-145055 | | 6/2006 |
| JP | 2006-250485 | | 9/2006 |
| JP | 2007-017018 | | 1/2007 |
| JP | 2007-093208 | | 4/2007 |
| JP | 2007-132605 | | 5/2007 |
| JP | 2008-8550 | | 1/2008 |
| JP | 2008-196744 | | 8/2008 |
| JP | 2008-196752 | | 8/2008 |
| JP | 2009-036433 | | 2/2009 |
| KR | 1999-003684 | | 1/1999 |
| KR | 20-0301747 | | 1/2003 |
| KR | 20-0334077 | | 11/2003 |
| KR | 2006-0025806 | | 3/2006 |
| KR | 10-0634366 | | 10/2006 |
| KR | 2007-008046 | | 1/2008 |
| WO | WO 2006/126584 | | 11/2006 |
| WO | WO2007/009783 | | 1/2007 |

OTHER PUBLICATIONS

U.S. Office Action issued in U.S. Appl. No. 12/345,984 dated May 23, 2011.
Chinese Office Action issued in CN Application No. 2011092100646340 dated Sep. 26, 2011.
U.S. Office Action issued in U.S. Appl. No. 12/510,372 dated Nov. 30, 2011.
International Search Report issued in PCT Application No. PCT/KR2010/001496 dated Oct. 22, 2010.
International Search Report issued in PCT Application No. PCT/KR2010/001495 dated Oct. 25, 2010.
International Search Report issued in PCT Application No. PCT/KR2010/001409 dated Oct. 25, 2010.
International Search Report issued in PCT Application No. PCT/KR2010/001410 dated Oct. 25, 2010.
International Search Report dated Dec. 8, 2008.
International Search Report dated Dec. 3, 2008.
U.S. Office Action issued in U.S. Appl. No. 12/390,524 dated Aug. 25, 2011.
U.S. Office Action issued in U.S. Appl. No. 12/345,946 dated Sep. 26, 2011.
U.S. Office Action issued in U.S. Appl. No. 12/345,984 dated Sep. 26, 2011.
International Search Report dated Oct. 22, 2010 (Application No. PCT/KR2010/001497).
U.S. Office Action issued in U.S. Appl. No. 12/390,520 dated Apr. 22, 2011.
U.S. Appl. No. 12/390,520, filed Feb. 23, 2009.
U.S. Appl. No. 12/390,523, filed Feb. 23, 2009.
U.S. Appl. No. 12/390,524, filed Feb. 23, 2009.
U.S. Appl. No. 12/390,527, filed Feb. 23, 2009.
U.S. Appl. No. 12/510,372, filed Jul. 28, 2009.
U.S. Appl. No. 12/345,946, filed Dec. 30, 2008.
U.S. Appl. No. 12/345,984, filed Dec. 30, 2008.
U.S. Appl. No. 12/724,558, filed Mar. 16, 2010.
U.S. Appl. No. 12/724,571, filed Mar. 16, 2010.
U.S. Appl. No. 12/724,606, filed Mar. 16, 2010.
U.S. Appl. No. 12/726,643, filed Mar. 18, 2010.
U.S. Appl. No. 12/724,648, filed Mar. 16, 2010.
U.S. Office Action issued in U.S. Appl. No. 12/390,523 datedFeb. 7, 2012.
U.S. Office Action issued in U.S. Appl. No. 12/724,558 dated Mar. 14, 2012.
Notice of Allowance issued in U.S. Appl. No. 12/390,523 dated Jun. 27, 2012.
Final Office Action issued in U.S. Appl. No. 12/724,558 dated Aug. 13, 2012.

* cited by examiner

REFRIGERATOR, SYSTEM AND METHOD FOR DRIVING A DRAWER OF THE REFRIGERATOR

This application is a continuation-in-part of PCT Application No. PCT/KR2008/001697 filed on Mar. 26, 2008. This document is hereby incorporated by reference.

BACKGROUND

1. Field

This relates to a refrigerator and a system and method for driving a drawer of the refrigerator.

2. Background

A refrigerator is an appliance for the storage of fresh food. Refrigerators may generally be categorized into top freezer types, bottom freezer types, and side-by-side refrigerators, depending on the respective positions of the freezer and refrigeration compartments.

For example, the bottom freezer configuration has the freezer compartment positioned below the refrigeration compartment. In the bottom freezer configuration, a door that pivots about an edge of the main body may open and close the refrigeration compartment, and a door that opens and closes the freezer compartment may be provided with a storage box door that moves forward and rearward relative to the main body. Because in this configuration the freezer compartment is provided below the refrigeration compartment, a user stoops to grasp and pull the door forward in order to open the freezer compartment. A system to facilitate the opening and/or closing of such a freezer compartment would enhance the utility or convenience of a bottom freezer type refrigerator. Further, a system to facilitate opening and/or closing of a drawer in a refrigerator would enhance user convenience.

BRIEF DESCRIPTION OF THE DRAWINGS

The embodiments will be described in detail with reference to the following drawings in which like reference numerals refer to like elements wherein.

DETAILED DESCRIPTION

Figure 1:
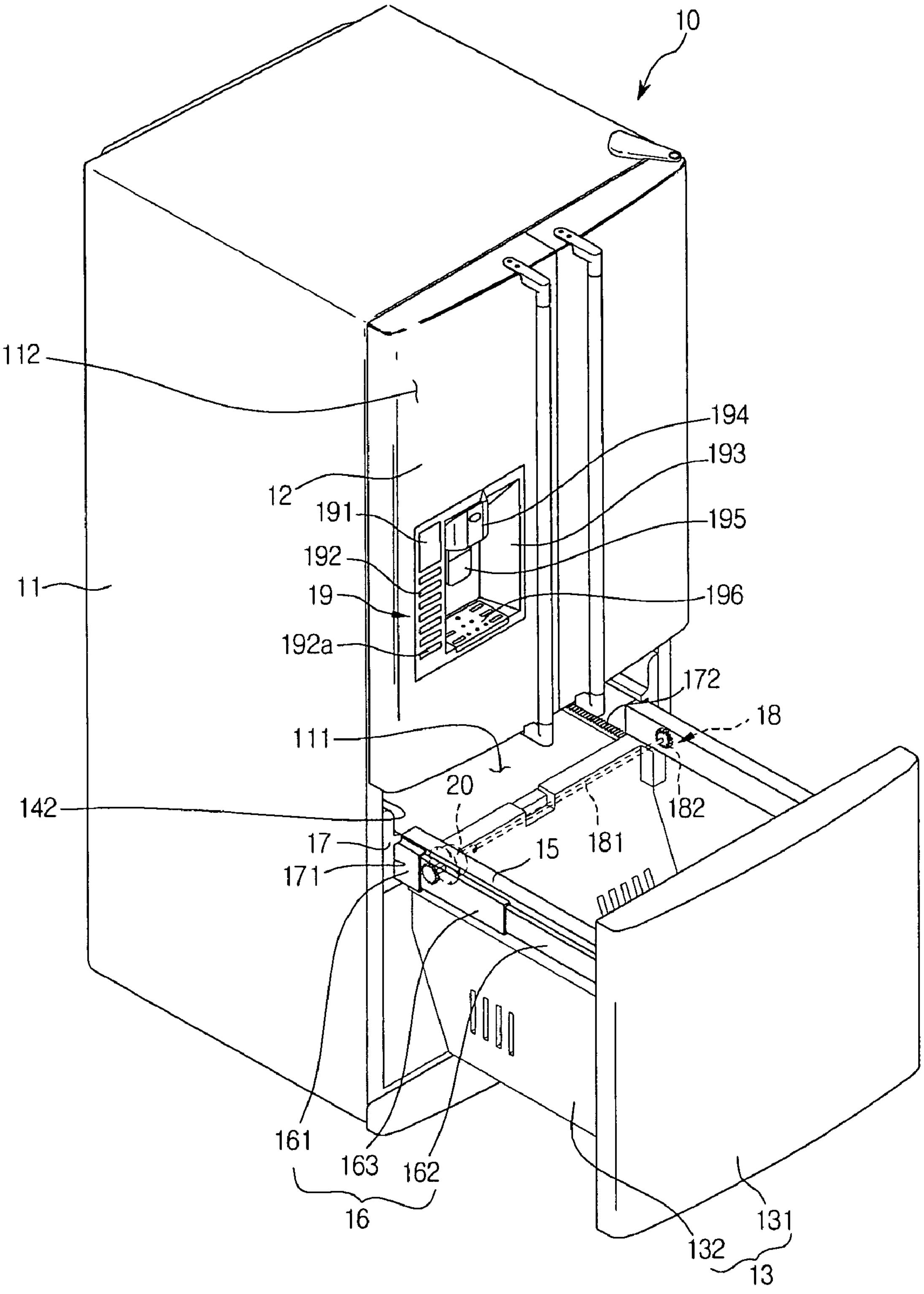
FIG. 1 is a perspective view of an exemplary refrigerator provided with a drawer movement structure according to an embodiment as broadly described herein.

To facilitate the opening and/or closing of a compartment of a refrigerator, such as, for example, a lower freezer compartment, an automatic opening configuration may be provided. This automatic opener may determine when a user intends to open a compartment door by sensing a gripping or grasping of a door handle as the compartment door is moved a predetermined distance forward from the front surface of the main body, and then automatically moving the door, and the storage box to which it is coupled, to an open position. A motor may be provided with the appropriate compartment, and a rotating member such as, for example, a gear may be connected to a shaft of the motor. As an undersurface of the storage box comes into contact with the rotating member, the storage box moves forward and rearward based on a direction of the rotation of the rotating member.

However, when using this type of automatic opener, a user still grasps and exerts a pulling force on the handle to initiate the automatic opening. Typically, a sealing member such as, for example, a gasket may be attached to the rear surface of the storage box to prevent cold air leakage, and an adhering member such, for example, as a magnet may be provided inside the sealing member to maintain a tight seal therebetween. Thus in order to initiate movement of the storage box, a user grasps and pulls the storage box with a force greater than the magnetic force. In addition, when the storage box is provided at the bottom of the refrigerator, a user stoops to pull it out, which may be physically challenging for children, the elderly, and smaller users. Also, the handle necessarily protrudes from the front surface of the storage box, thereby increasing the dimensions for the packaging and installation of the refrigerator and presenting a potential hazard for users who may collide with the handle. It is difficult or not possible to omit the handle in this type of automatic opener.

Further, the time it takes for a user to grasp a handle and initiate movement of the storage box, coupled with the time it takes for a controller to sense this movement and provide for automated movement of the storage box may be excessive, thus reducing utility. Additionally, the automatic opener may only move the storage box a distance adequate to separate it from the refrigerator main body, and thus a user still directly grasps the handle and pulls the storage box further forward thereafter. When the weight of food stored in the storage box may be considerable, withdrawing the storage box in this manner may be difficult.

By providing a drive motor and a gear assembly on the floor of the refrigeration compartment or the freezer compartment to provide for movement of a storage box provided therein, the storage space within the refrigerator may be reduced by the volume consumed by the motor and gear assembly. This may also result in a loss of insulation in the refrigerator main body. That is, if the inner case were to be recessed to receive a motor, an insulating layer between the inner case and an outer case of the main body would become thinner, thus reducing insulation between the inside and outside of the refrigerator.

Further, if movement of the storage box is driven by this type of motor and gear assembly, such a gear assembly would likely include a rack that engages a gear, the rack extending from front to rear along the floor of the storage box. Thus, the length of the rack would necessarily be limited by the overall length of the floor of the storage box. For example, the rear surface of a freezer compartment storage box in a bottom freezer refrigerator may be sloped to accommodate a machine room provided at a lower rear portion of the refrigerator. Thus the length of the lower portion of the freezer compartment storage box may be less than the length of the upper portion thereof, limiting accessibility to the interior of the storage box. If a plurality of storage boxes are provided one on top of another, a separate motor and gear assembly may be provided for each storage box, thereby complicating the support structure required for the stack storage boxes.

Additionally, the automatic opener described above may include a mechanism such as, for example, a switch, to simply sense whether or not the storage box has been fully withdrawn or closed. However, this switch would not be necessarily sense whether or not the storage box is being withdrawn at a normal speed, whether or not the withdrawing of the storage box is impeded by obstacles, and whether or not the storage box is being withdrawn at a set speed regardless of the weight of food stored therein.

Figure 2:
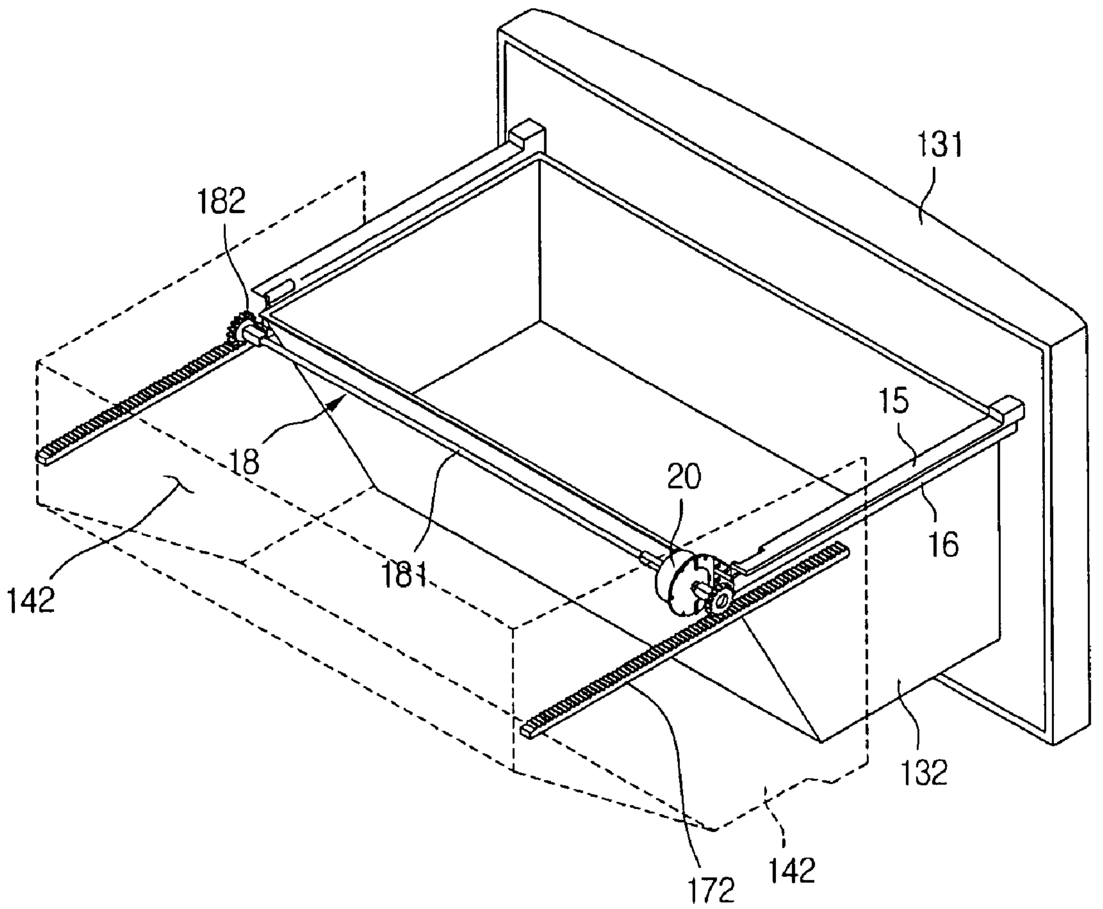
FIG. 2 is a perspective view of a storage box assembly for the exemplary refrigerator shown in FIG. 1.

The exemplary bottom freezer type refrigerator 10 shown in FIGS. 1 and 2 may include a main body 11 that defines a refrigeration compartment 112 and a freezer compartment 111. A refrigeration compartment door 12 may rotatably installed on the front of the main body 11 to open and close the refrigeration compartment, and a drawer 13 may be provided below the refrigeration compartment. The drawer 13 may be inserted into and withdrawn from the inside of the freezer compartment 111 so that goods or items stored therein may be accessed as necessary.

The drawer 13 may include a door 131 that forms a front exterior of the drawer 13 and a storage box 132 provided behind the door 131 to receive store food items. A frame 15 may extend rearward from a rear of the freezer compartment door 131 to support opposite side edges of the storage box 132, and a rail assembly 16 may be positioned corresponding to the frame 15 to allow the storage box 132 to be inserted into and withdrawn from the freezer compartment 111. The rail assembly 16 may have a first end fixed to an inner surface of the freezer compartment 111 formed by an inner case 142 of the refrigerator 10, and a second end fixed to the frame 15 to allow the rail assembly 16 to be adjusted in length and to allow the storage box 132 to be inserted into and withdrawn from the freezer compartment 111 along the rail assembly 16.

The refrigerator 10 may also include an anti-wobble, or alignment apparatus for preventing wobbling or mis-alignment as the storage box 132 is withdrawn from or inserted into the freezer compartment 111. A rail guide 17 provided at one or both opposite sides of the freezer compartment 111 corresponding to the rail assembly 16 to hold and guide the rail assembly 16, and a movement apparatus for automatically moving, that is, withdrawing and inserting, the storage box 132 relative to the freezer compartment 111. In detail, the alignment apparatus may include a suspended portion 18 coupled to the rear of the frame 15 to prevent lateral wobbling or uncoordinated lateral movement when the storage box 132 is being withdrawn from or inserted into the freezer compartment 111, and a guide member provided on the rail guide 17 to guide the movement of the suspended portion 18. The guide member may include a rail mounting recess 171 formed in the rail guide 17 to receive the rail assembly 16 and a guide rack 172 that extends from front to rear at the bottom of the rail mounting recess 171.

The suspended portion 18 may include a shaft 181 with its opposite ends connected to a respective portion of the frame 15 provided on opposite sides of the storage box 132, and a pinion 182 provided respectively at one or both ends of the shaft 181. A plurality of gears may be formed on the outer peripheral surface of the pinion 182, and a corresponding plurality of gear teeth may be formed on the upper surface of the guide rack 172 to engage the pinion 182. Accordingly, when the pinion 182 rotates in an engaged state with the guide rack 172, the pinion 182 rolls along the guide rack 172 to in turn move the storage box 132, and the drawer 13 is not biased to the left or right, but is withdrawn in a straight path. Thus, the shaft 181, pinion 182 and guide rack 172 prevent the drawer 13 from wobbling or moving laterally.

In certain embodiments, the drawer 13 may be withdrawn from the refrigerator 10 automatically. For this purpose, the drawer movement apparatus may include a driving force generator coupled to one or all of the pinions 182 to impart a rotational force on the pinions 182, and a driving force transmitter that transmits the driving force from the driving force generator to the pinions 182 to allow the storage box 132 to be moved. The driving force generator may be, for example, a drive motor 20 that provides rotational force to the pinions 182 and the driving force transmitter may be, for example, an anti-wobble or alignment apparatus including the suspended portion 18 and the guide rack 172 as described above. That is, the alignment apparatus may prevent lateral misalignment wobbling of the drawer 13, while also transmitting a driving force that automatically moves the drawer 13. The driving force generator may be provided with the freezer compartment door 131, and may include a drive motor 20 or other driving means capable of automatically moving the drawer 13, such as, for example, an actuator employing a solenoid.

Figure 3:
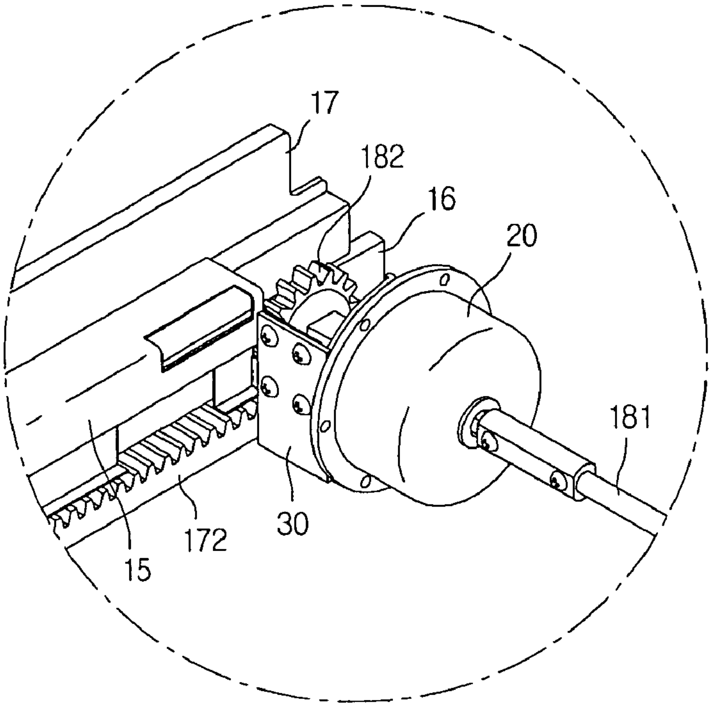
FIG. 3 is a detailed perspective view of a drawer movement apparatus according to an embodiment as broadly described herein.
Figure 4:
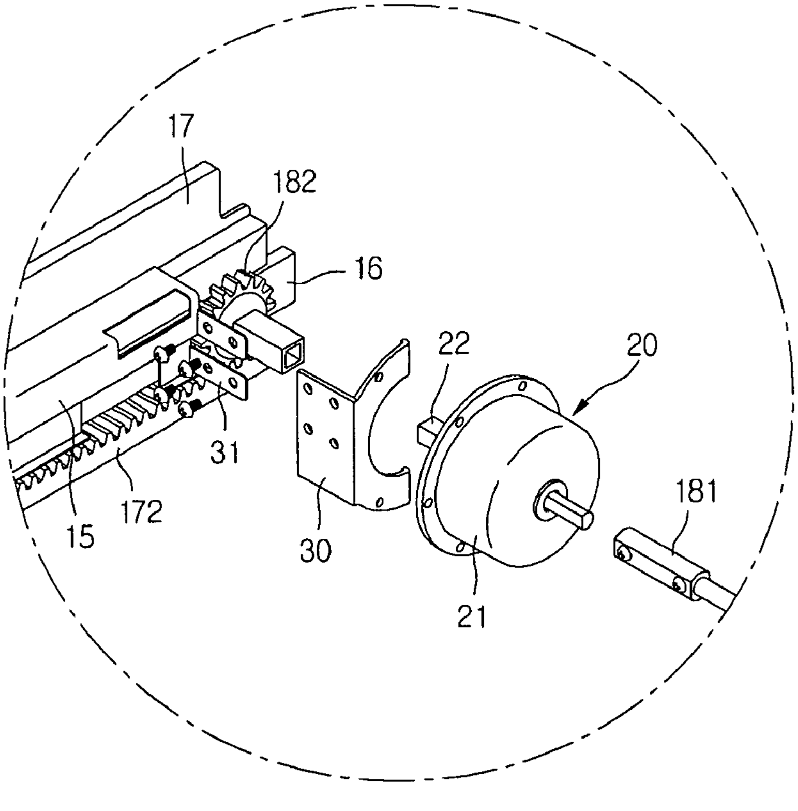
FIG. 4 is an exploded perspective view of the drawer movement apparatus shown in FIG. 3.

A distance detection sensor 24 may be used to detect a withdrawal/insertion distance of the drawer 13. The distance detection sensor 24 may be provided, for example, on an outer circumference of the drive motor 20, as shown in FIGS. 3 and 4, or other location as appropriate. The distance detection sensor 24 may be a sensor that uses infrared rays, ultrasonic waves, or other types of sensors as appropriate. The distance detection sensor 24 may be positioned so as to detect a change or difference in distance between a predetermined portion of the drawer 13 and a corresponding predetermined portion of the compartment in which the drawer 13 is received. For example, the distance detection sensor 24 may be positioned so as to sense a distance, and a change in distance, between the drawer 13 and the rear wall of the compartment.

If, for example, the distance detection sensor 24 is an infrared sensor that senses a distance between the drawer and the rear wall of the compartment, the distance detection sensor 24 may include a light emitting unit and a light reception unit. An infrared signal emitted from the light-emitting unit collides with the rear wall of the compartment and is reflected back to the light reception unit. The main controller 810 may then determine the distance between the drawer 13 and the rear wall of the compartment using a voltage value of the infrared signal detected by the light reception unit. If the distance detection sensor 24 is an ultrasonic wave sensor, the distance may be determined through a similar process.

The rail assembly 16 may include a fixed rail 161 fixed to the rail mounting recess 171, a moving rail 162 fixed to the frame 15, and an extending rail 163 that extends between the fixed rail 161 and the moving rail 162. Depending on a frontto-rear length of the storage box 132, the rail assembly 16 may include one or more extending rails 163. In certain embodiments, the rail assembly 16 may include only the fixed rail 161 and the moving rail 162. Additionally, the shaft 181 and the drive motor 20 may be provided at a rear of the frame 15, or may be provided at a rear of the moving rail 162, depending on the particular storage box 132/refrigerator 10 design. The storage box 132 may be detachably coupled to the frame 15 to allow the storage box 132 to be removed from the refrigerator 10 for periodic cleaning.

A dispenser 19 for dispensing water or ice may be provided at the front of the refrigeration compartment door 12. The dispenser 19 may include a receptacle 193 comprising a recess having a predetermined depth, and a chute 194 and a dispensing tap (not shown in detail) through which ice and water may be dispensed by actuating a lever 195. A water pan 196 may be provided on the floor of the receptacle 193. A display 191 for displaying various data such as, for example, an operating state of the refrigerator 10 and a temperature inside the refrigerator 10, and a button panel 192 including various input buttons 192*a*, may be provided with the dispenser 19. Various commands for withdrawing and inserting the storage box 132 may be input using the input buttons 192*a*.

An input button 192*a* for entering a command to withdraw the storage box 132 from or insert the storage box 132 into the refrigerator 10 may be provided in various formats such as, for example, a capacitive switch employing changes in electrostatic capacitance, a tact switch, a toggle switch, or other type of switch as appropriate. Additionally, although the input button 192*a* shown in FIG. 1 is provided at one side of the dispenser 19, the button panel 192 and/or input buttons 192*a* may alternatively be provided in a touch button configuration on a front or side surface of the refrigerator or freezer compartment door as appropriate, and not necessarily with the dispenser 19.

For example, if the input button 192*a* were provided on the front surface of the freezer compartment door 131, the input button 192*a* may include a vibration sensor switch that operates by detecting vibrations transferred to the freezer compartment door 131. That is, if, for example, a user is unable to use either hand to initiate the opening of the door 131, and instead imparts a gentle shock with, for example, a foot, to the freezer compartment door 131, the vibration transferred from the shock may be sensed and the drive motor 20 may be operated to withdraw the storage box 132 from the freezer compartment 111.

In alternative embodiments, the input button 192*a* may instead be provided on a separate remote control unit that controls various other functions of the refrigerator, or other devices within a given range. For example, an input button 192*a* that controls movement of the drawer 23 may be provided with a remote control unit that controls, for example, internal temperatures of the various compartments of the refrigerator, operation of a display module/television mounted on a surface of the refrigerator, and the like.

A drawer movement apparatus according to an embodiment as broadly described herein is shown in more detail in FIGS. 3 and 4. As discussed above, the anti-wobble, or alignment apparatus may include the suspended portion 18 and the guide rack 172, and the suspended portion 18 may include the shaft 181 and the pinion 182. Although in this embodiment the guide rack 172 and the pinion 182 form the alignment apparatus, these elements may be structured differently as long as they perform the anti-wobble and/or alignment function. For example, a roller surrounded by a friction member may be used instead of the pinion 182, and a friction member that contacts the roller, instead of the guide rack 172, to generate friction may be used to slide the storage box 132 into and out of the refrigerator 10 without slippage.

The drive motor 20 may be an inner rotor type motor, and the pinion 182 may be connected to a motor shaft 22 connected to the rotor. The drive motor 20 may be any motor capable of both forward and reverse rotation and variable speed operation.

Such a rotor and stator, or other components forming the drive motor 20, may be protected by a housing 21. A fastening mount 31 may extend from the frame 15, and the fastening mount 31 and the housing 21 of the drive motor 20 may be coupled by a bracket 30. Accordingly, the assembly of the drive motor 20 and the suspended portion 18 may be fixedly coupled to a rear portion of the frame 15, and the pinion 182 may be coupled to the motor shaft 22 so that pinion 182 may be rotated by the motor 20.

The drive motor 20 may be fixed to the frame 15 by various methods which all fall within the spirit and scope as presented herein. Also, the drive motor 20 may be fixed to the rear of the moving rail 162 instead of to the frame 15. In alternative embodiments, the drive motor 20 may be integrally provided with the frame 15.

Figure 5:
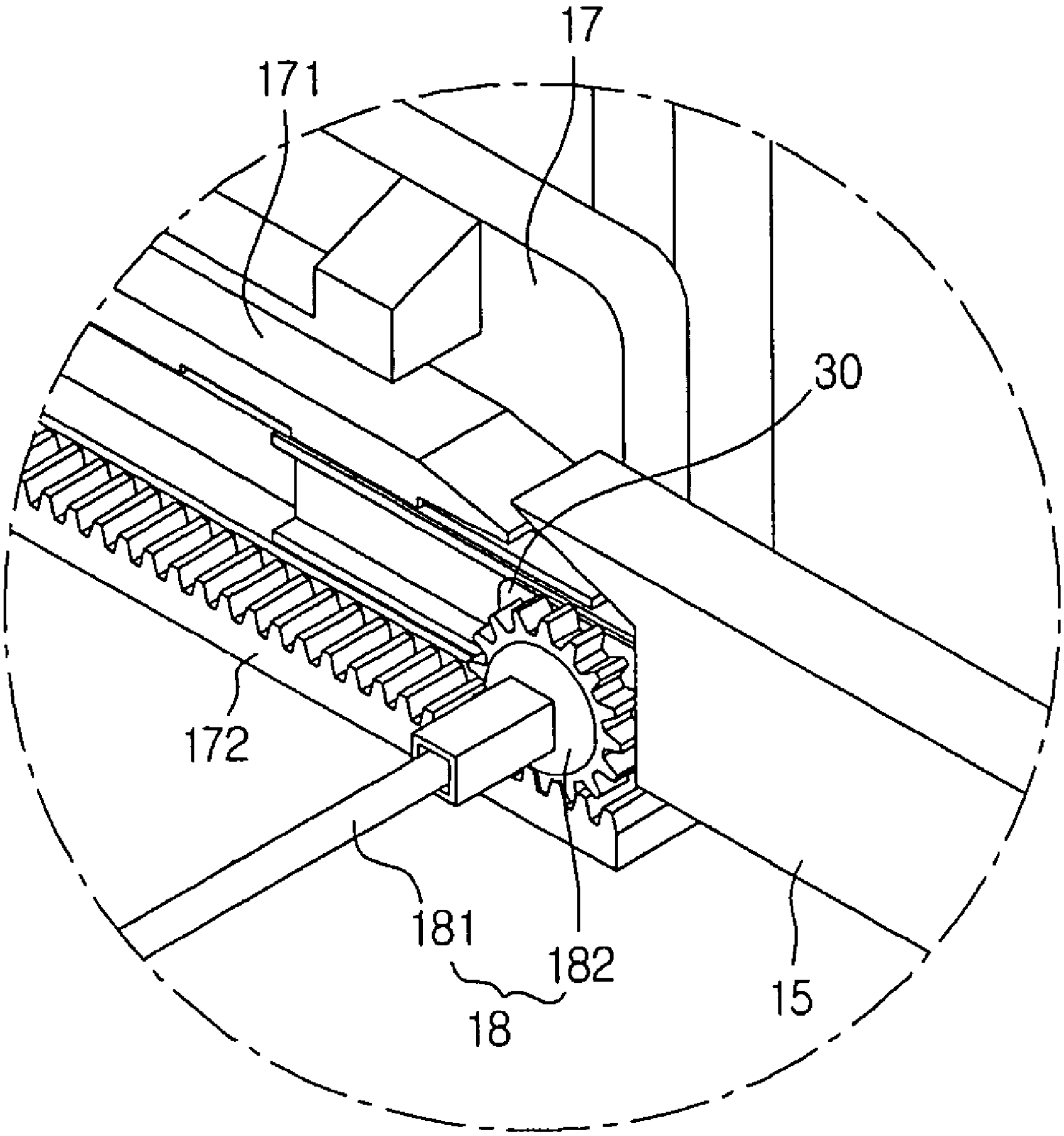
FIG. 5 is a partial perspective view of a suspended portion of the movement apparatus shown in FIG. 3.

The drive motor 20 shown in FIG. 5 is provided at only one end of the suspended portion 18. However, in alternative embodiments, a driving force generator, or drive motor 20, may be provided for each of the pinions 182 at opposite ends of the shaft 181. More specifically, as discussed above, a pinion 182 may be provided at each of the two opposite ends of the shaft 181. At an end of the suspended portion 18 to which a drive motor 20 is not provided, the shaft 181 may pass through the pinion 182 and be inserted into the frame 15. In other words, the bracket 30 provided at this side of the frame 15 may be repositioned such that the shaft 181 passes through the pinion 182 and is inserted into the bracket 30 to securely couple the shaft 181 to the frame 15 and prevent disengagement of one end of the storage box 132 from the frame 15 or lateral wobbling/mis-alignment of the storage box 132 during withdrawal and insertion of the storage box 132.

Alternatively, the end of the shaft 181 may instead be inserted into a rear portion of the moving rail 162, as described above.

The automatic movement process of a storage box 132 from a refrigerator 10 provided with a storage box movement apparatus as embodied and broadly described herein will now be discussed.

In order to withdraw the storage box 132 from a corresponding compartment of the refrigerator 10, a user first actuates an input button 192*a*, which, as discussed above, may be provided at one side of the dispenser 19, on a surface of the refrigerator 10, or on a remote control unit, as appropriate. Similarly, actuation of the input button 192*a* may be accomplished by simply pushing the button 192*a*, or by imparting an external shock to an appropriate portion of the refrigerator 10 to actuate a vibration sensor switch. When the input button 192*a* is actuated to initiate a storage box withdrawing command, the command is transmitted to a controller (not shown in detail) of the refrigerator 10. The controller of the refrigerator 10 transmits an operation signal to a drive motor controller that controls the operation of the drive motor 20. This operation signal may include, for example, directional data for moving the storage box 132 either out of or into the refrigerator 10, and moving speed data for the storage box 132. That is, the directional data indicates which direction the drive motor 20 should be rotated, and the speed data indicates a number of revolutions per minute (RPM) of the drive motor 20 to achieve a particular speed.

The drive motor 20 may then be driven according to the operation signal in order to move the door 131 and storage box 132 accordingly. This allows the storage box 132 to be automatically withdrawn from the refrigerator 10 without requiring a user to apply a specific, physical withdrawing movement, thus eliminating the need for a separate handle member on the front surface of the door 131. Thus, the door 131 may have a flush front surface without any protrusions to provide a clean exterior finish, and to provide an inner cover coupled to the rear of the outer cover with an insulator interposed therebetween to preserve the insulative qualities of the refrigerator 10.

The controller of the refrigerator 10 may receive RPM data associated with the rotation of the drive motor 20 in real time, and may calculate the withdrawing speed (in m/s or other unit, as appropriate) of the storage box 132 accordingly. For example, using the rotating speed of the drive motor 20 and a circumferential value of the pinion 182, the moving speed of the storage box 132 can be calculated per unit time. Using this data, the storage box 132 may be withdrawn at a preset speed, regardless of the weight of food stored in the storage box 132. In certain embodiments, the preset speed may be a speed which is selected by a user, and which may also be altered based on user preferences.

The storage box 132 may be continuously or intermittently withdrawn from or inserted into the refrigerator 10 according to how the input button 192*a* is manipulated. For example, the storage box 132 may be controlled so that it is completely withdrawn if the input button 192*a* is pressed once and/or held for a predetermined amount of time. Similarly, the storage box 132 may be controlled so that it is withdrawn in stages if the input button 192*a* is pressed repeatedly with a certain interval in between pressings. Other arrangements may also be appropriate.

The storage box 132 may also be controlled so that its movement is automatically stopped if the storage box 132 encounters an obstacle as the storage box 132 is moved.

The storage box 132 may be controlled so that it is stopped when it has been withdrawn a predetermined distance, and may be controlled so that it is either reinserted or withdrawn completely, based on the user's particular intentions. For example, if the storage box 132 has been stopped after being withdrawn a predetermined distance, the storage box 132 may then be completely withdrawn when a user pulls the freezer compartment door 131, or the storage box 132 may be re-inserted into the refrigerator 10 when a user pushes the freezer compartment door 131.

If a storage box withdrawal command is input through the input button 192*a*, and the storage box 132 is not in a withdrawn or open state, or stops during withdrawal, this may be sensed and an error signal may be generated. The storage box 132 may be controlled so that it is automatically closed when left in a withdrawn or open state for more than a predetermined amount of time, in order to minimize cold air loss.

The storage box 132 of a refrigerator 10 according to embodiments as broadly described herein may not only be automatically withdrawn, but withdrawn manually as well. For example, in the event of a power outage where power cannot be supplied to the drive motor 20, or when a user does not manipulate the input button 192*a* but instead grasps and pulls or pushes the door 131 by hand, the storage box 132 is not subjected to resistance from the drive motor 20 and may be smoothly withdrawn or re-inserted into the refrigerator 10. In other words, even when the drive motor 20 does not operate, withdrawal of the storage box 132 is not impeded by the drive motor 20.

As an alternative to the drive motor 20 being connected to the controller of the refrigerator 10 by a plurality of signal wires and receiving power through a plurality of electrical wires, a charging apparatus may be provided with the drive motor 20 to eliminate the need for electrical wires, and a short range wireless transmitter-receiver system may be provided to eliminate the need for signal wires and electrical wires.

Although, for ease of discussion, the drawer movement apparatus has to this point been applied to the movement of a freezer compartment door in a bottom freezer type refrigerator, it is well understood that such an apparatus can be applied to advantageous effect in other types of household appliances. For example, a drawer movement apparatus as embodied and broadly described herein may be applied to a side-by-side refrigerator, to a refrigerator having multiple segregated compartments stacked either vertically or horizontally, or other arrangement as appropriate.

Figure 6:
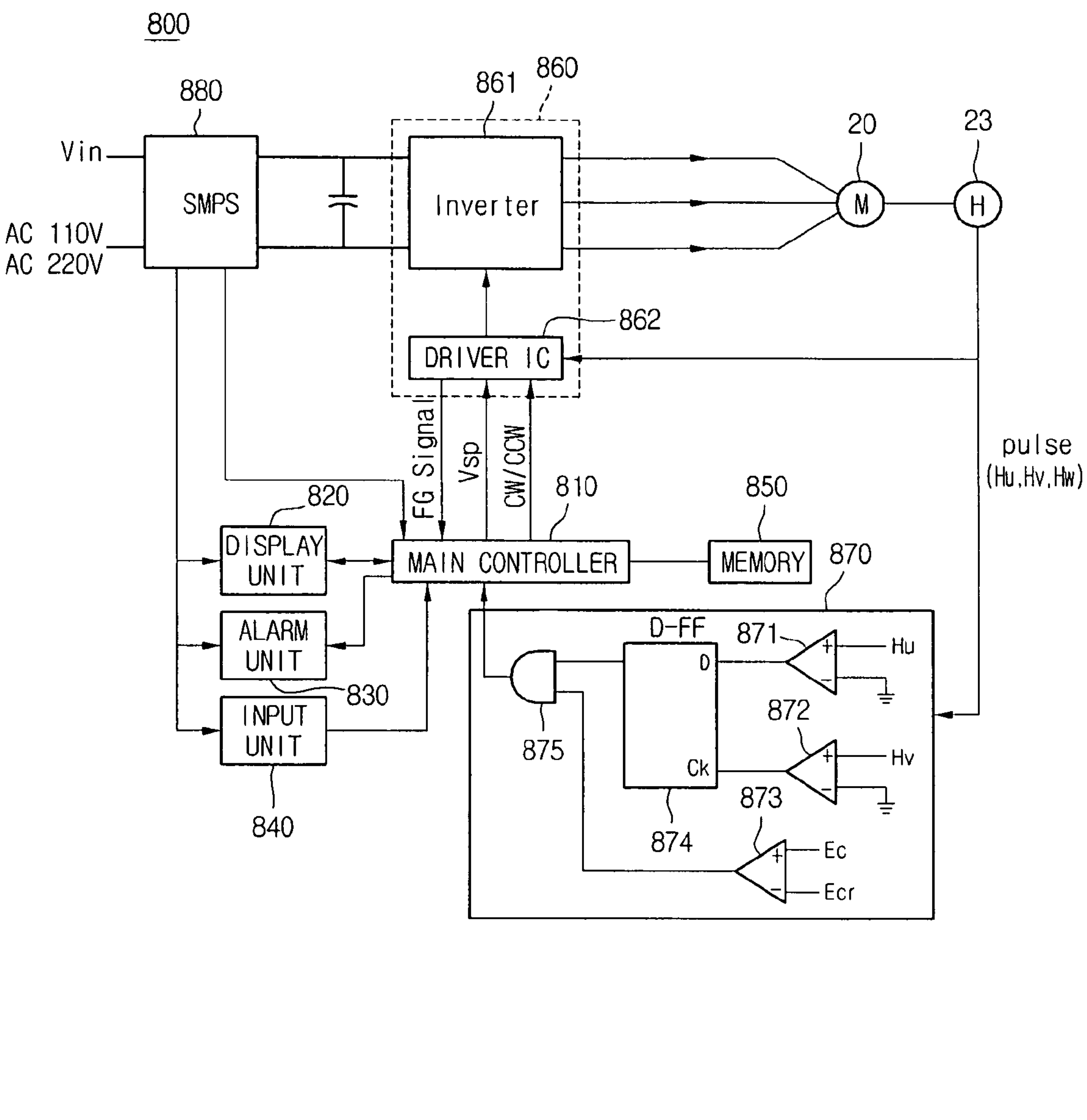
FIG. 6 is a block diagram of a driving system for a drawer of a refrigerator according to embodiments as broadly described herein.

FIG. 6 is a block diagram of a driving system for a drawer of a refrigerator according to embodiments as broadly described herein.

The driving system 800 may include a main controller 810 that controls overall operation of the refrigerator 10, a motor controller 860 that controls driving of the drive motor 20, an input unit 840 that receives commands for moving, or withdrawing and inserting, the drawer 13 and transmits the received commands to the main controller 810, a display 820 that displays various information, such as, for example, an operating state of the refrigerator 10, a warning unit 830 that issues a warning when a system error occurs during operation of the refrigerator 10, a memory 850 that stores various data from the motor controller 860 and the input unit 840, a switched-mode power supply (SMPS) 880 that applies power to various electrical components to operate the refrigerator 10, and a rotating direction detecting unit 870 that outputs a signal that indicates a rotation direction of the drive motor 20, such as, for example a LOW or HIGH signal according to whether the drive motor 20 is rotating in a forward or in a reverse direction. A distance detection unit 890 may include a variety of different types of sensors, including, for example, an infrared sensor or an ultrasonic wave sensor, to detect a movement distance of the drawer 13.

In certain embodiments, the drive motor 20 may include a stator and a rotor, and may be a 3-phase brushless direct current (BLDC) motor with 3 hall sensors ($H_U$, $H_V$, $H_W$) 23 provided with the rotor. The motor controller 860 may include a driver integrated circuit (IC) 862 that receives a motor driving signal from the main controller 810 to control operation of the drive motor 20, and an inverter 861 that receives a DC voltage applied from the SMPS 880 and applies a 3-phase current to the drive motor 20 according to a switching signal transmitted from the driver IC 862.

Operation of the driving system for the drawer will now be discussed.

First, the SMPS 880 transforms and rectifies an incoming 110V or 220V alternating current (AC) to direct current (DC) and outputs a DC voltage of a predetermined level such as, for example, a DC of 220V. The inverter 861 switches the DC voltage applied by the SMPS 880 to generate a 3-phase AC voltage having a sine waveform. The 3-phase AC voltage output from the inverter 861 may include, for example, a U-phase, a V-phase, and a W-phase voltage.

If, as discussed above, the drive motor 20 is a BLDC motor provided with hall sensors 23, power may be applied to the drive motor 20 to rotate the rotor. That is, a switching signal may be transmitted from the driver IC 862 to the inverter 861, and the inverter 861 may apply a voltage to each of three coil windings U, V, and W wound around the stator based on the switching signal having a 120° phase shift.

Thus, based on, for example, a drawer withdrawal command received by the input unit 840, the main controller 810 transmits a speed command signal $V_{SP}$ and a rotation direction command signal CW/CCW to the motor controller 860 to rotate the drive motor 20 accordingly.

As the drive motor 20 rotates, the hall sensors 23 generate detecting sensors, or pulses, based on a number of poles of permanent magnets provided on the rotor. For example, if the number of poles of the permanent magnet(s) provided on the rotor is 8, then 24 pulses are generated for every rotation of the drive motor 20, e.g., a number of pulses per rotation may be equal to a number of magnets times a number of hall sensors.

The pulse signals $H_U$, $H_V$ and $H_W$ generated by the hall sensors 23 are transmitted to the driver IC 862 and the rotating direction detecting unit 870. The rotation direction detecting unit 870 uses the pulse signals $H_U$, $H_V$ and $H_W$ to detect the rotating direction of the drive motor 20, and transmits the detected data to the main controller 810.

The driver IC 862 uses the pulse signals $H_U$, $H_V$ and $H_W$ to generate a frequency generator (FG) pulse signal. That is, in an FG circuit provided within the driver IC 862, the pulse signals $H_U$, $H_V$ and $H_W$ output from the hall sensors 23 are used to generate and output FG pulse signals corresponding to a number of rotations of the drive motor 20. For example, if there were A numbers of FG pulse signals for every rotation of the drive motor 20, and B numbers of actual FG pulse signals were generated during a particular withdrawal of the drawer 13, the number of rotations of the drive motor 20 would be B/A. Also, because the rotation direction of the drive motor 20 may be sensed by the rotating direction detecting unit 870, the number of FG pulse signals may be counted as a positive value when the rotating direction of the drive motor 20 is forward, and the number may be counted as a negative value for reverse rotation. Thus, an absolute position of the drive motor 20 or the drawer 13 may be determined, and it may also be determined whether the drawer 13 has been manually pushed or pulled. The memory 850 stores data on the number of FG pulse signals in a table based on a moved distance of the drawer 13.

FG pulse signals are transmitted from the driver IC 862 to the main controller 810. The main controller 810 uses the transmitted FG pulse signals to calculate the rotating speed of the drive motor 20. Also, by using the rotating speed and time of the drive motor 20, the main controller may also calculate a corresponding moved speed and moved distance of the drive motor 20, and/or a corresponding moved speed and moved distance of the drawer 13.

Figure 7:
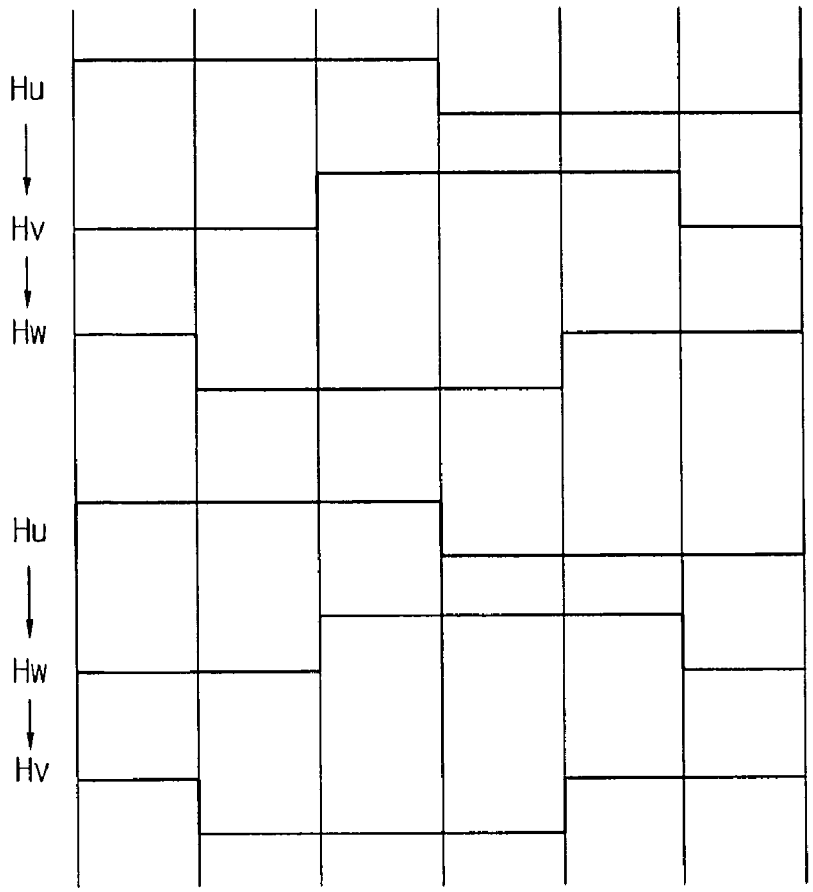
FIG. 7 is a waveform chart showing the shape of a pulse signal detected by a hall sensor based on a direction of rotation of a drive motor.

When the rotor of the drive motor 20 rotates, pulse signals $H_U$, $H_V$ and $H_W$ may be detected by the respective hall sensors 23, as shown in FIG. 7. That is, when the drive motor 20 rotates in a forward direction, the pulse signals may be detected in the sequence $H_U \rightarrow H_V \rightarrow H_W$. Likewise, the pulse signals $H_U$, $H_V$ and $H_W$ may be detected in the sequence $H_U \rightarrow H_V \rightarrow H_W$ for reverse rotation. The rotating direction detecting unit 870 may compare a portion of the signals $H_U$, $H_V$ and $H_W$ sensed by the hall sensors 23 to a zero-level reference value, and then determine rotating direction of the drive motor 20 based on this comparison.

For this purpose, the rotating direction detecting unit 870 may include a first comparator 871 that compares a first signal output from the hall sensors 23 with a reference signal, and a second comparator 872 that compares a second signal output from the hall sensors 23 to a reference signal. The rotating direction detecting unit 870 may also include a D-flip flop (DFF) 874 that designates a signal output from the first comparator 871 as an input signal D, inverts a signal output from the second comparator 872 and performs logic-combining to yield a clock signal CK, and outputs corresponding output signals. A third comparator 873 compares and outputs two driving voltages Ec and Ecr that are variable based on kick, brake, and other control functions of the drive motor 20. An AND gate 875 logic-combines an output of the D-flip flop 874 with an output of the third comparator 873.

The AND gate 875 may then output a HIGH signal when the rotating direction detecting unit 870 determines that the drive motor 20 is rotating in reverse, and a LOW signal when the drive motor 20 is rotating in a forward direction. The HIGH signal or LOW signal may be transmitted to the main controller 810, and the main controller 810 may store data on a current rotation direction of the drive motor 20 in the memory 850. The FG pulse signal transmitted from the driver IC 862 may also be stored in the memory 850.

Figure 8:
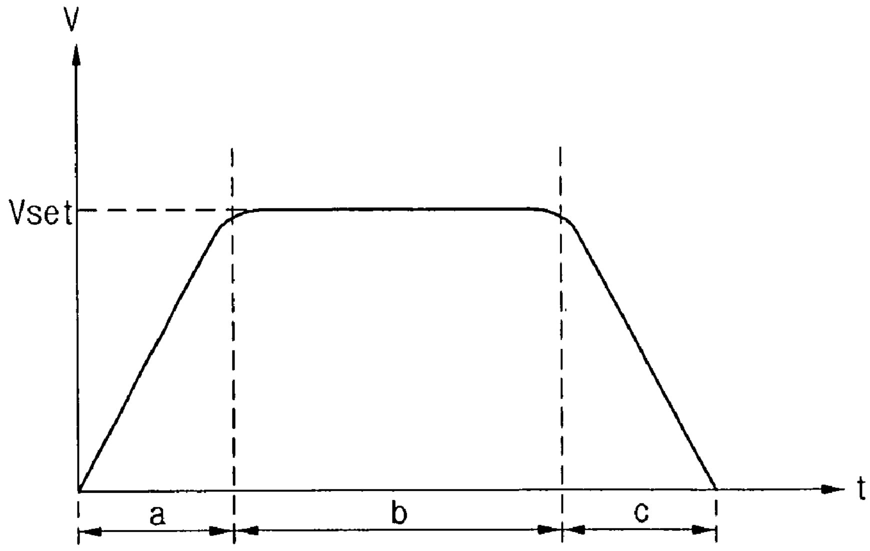
FIG. 8 is a graph showing the moving speed of a drawer of a refrigerator when moved by a driving system according to embodiments as broadly described herein.

FIG. 8 is a graph of moving speed V of a drawer 13 of a refrigerator 10 over time t as the drawer 13 is withdrawn.

In certain embodiments, the drive motor 20 may move integrally with the drawer 13, so that the moving speed and moving distance of the drawer 13 correspond to the moving speed and moving distance of the drive motor 20.

Thus, when a drawer withdrawal command is received, a speed of the drawer 13 increases as it moves at an acceleration rate (a) until it attains a preset speed ($V_{SET}$). When the drawer 13 reaches the preset speed $V_{SET}$, it moves at a constant speed (b), i.e., with little to no acceleration. At a predetermined time, before a reference point at which the drawer 13 is considered completely open, a speed of the drawer 13 is reduced at a deceleration rate (c). This is to prevent the drawer 13 from continuing to accelerate until it is completely open, thus preventing the drawer 13 from generating a noisy "thunk" at the completion of its opening and/or any damage to the drawer 13 or the movement apparatus. Thus, the accelerating region (a) occupies a relatively small portion of the overall movement of the drawer 13.

The process of closing the drawer 13 from a completely open state may involve a similar speed distribution as in the opening process.

If a preset time elapses after the drawer 13 has been moved to an open position, and no command to move the drawer again has been received or an external force exerted, the drawer 13 may automatically close to minimize unnecessary loss of cold air.

Due to the weight of items stored in the drawer 13, the drawer 13 may be unable to maintain a regular speed distribution as it is moved. That is, when a predetermined voltage is applied to the drive motor 20, the movement speed of the drawer 13 may vary depending on the weight of the contents of the drawer 13. However, a controlling method as embodied and broadly described herein allows a drawer 13 to be consistently moved at a preset speed distribution, regardless of the effects from varying weights of items stored in the drawer 13. Such a method will now be discussed.

First, a user inputs a drawer movement command that is received by the input unit 840 (S10) and the received drawer movement command is transmitted to the main controller 810. The drawer movement command may be, for example, a command to withdraw the drawer 13 from the refrigerator 10, or to insert the drawer 13 back into the refrigerator 10. Then, the main controller 810 transmits appropriate commands to the motor controller 860 such as, for example, a rotating speed command $V_{SP}$ and a rotating direction command CW/CCW to the driver IC 862.

The speed and directional commands $V_{SP}$ and CW/CCW are transmitted from the driver IC 862 of the motor controller 860 to the inverter 861 as a switching signal corresponding to the command transmitted from the main controller 810. Thus, current in the inverter 861 is applied with respective phase shifts between three coils wound around a stator of the drive motor 20, in accordance with the input switching signal and, magnetic fields are generated at the stator coils by means of the current to rotate the rotor. The intensity of the magnetic fields formed at the rotor is detected by the hall sensors 23, and each switching device is sequentially turned ON/OFF according to the detected magnetic field intensities to continuously rotate the rotor and drive the drive motor 20.

Data on the rotating speed and rotating direction of the rotor of the drive motor 20 is transmitted to the main controller 810 according to the driving of the drive motor 20.

More specifically, when the rotor of the drive motor 20 rotates, pulse signals $H_U$, $H_V$, and $H_W$ are respectively generated by three hall sensors 23 arranged a predetermined distance apart from one another on the stator. The pulse signals $H_U$, $H_V$, and $H_W$ are transmitted to the driver IC 862 and the rotating direction detecting unit 870. The pulse signal transmitted to the driver IC 862 generates an FG pulse signal by means of the FG generating circuit and is transmitted to the main controller 810. The pulse signal transmitted to the rotating direction detecting unit 870 is detected in terms of the rotating direction of the rotor by a rotating direction detecting circuit, and is transmitted to the main controller 810.

The rotating speed or revolutions per minute (rpm) of the drive motor 20 is detected from the transmitted FG pulse signal by the main controller 810. Thus, the moving speed and moving distance of the drive motor 20 is calculated from the detected rotating speed of the drive motor 20.

In certain embodiments, the moving speed of the drive motor 20 (or moving speed of the drawer 13) may be derived from the following equations:

moving speed of drive motor (m/s)=rotating speed of drive motor (rpm)*circumference of pinion (m)/60 (1)

rotating speed of drive motor (rpm)=number of *FG* pulses generated per unit time (per minute)/number of *FG* pulses generated per rotation of drive motor (2)

The moving distance of the drive motor 20 may be derived from the moving speed of the drive motor 20 over a set duration.

Figure 9:
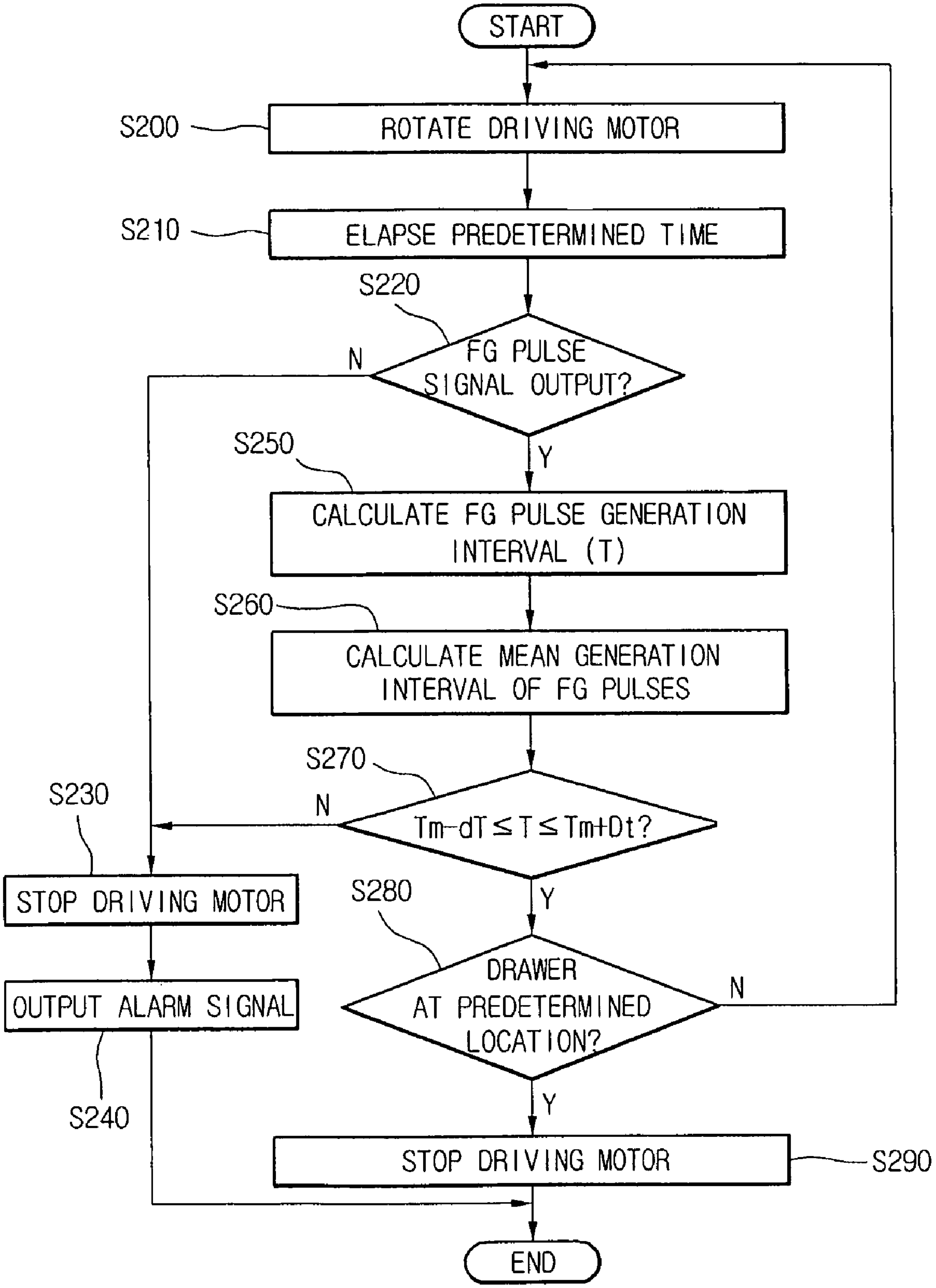
FIG. 9 is a flowchart of a method for driving a drawer of a refrigerator, according to an embodiment as broadly described herein, in which the drawer encounters an obstacle as it moves.

FIG. 9 is a flowchart of a method for driving a drawer of a refrigerator when the drawer encounters an obstacle as the drawer moves relative to a main body of the refrigerator. In this embodiment, it is determined that the drawer 13 has encountered an obstacle as it moves by detecting a variation in an RPM of the drive motor 20 provided with the drawer 13.

When a drawer moving command is input, either through the input button 192*a*, an external force applied to the drawer 13 by the user, or other means as appropriate, the drive motor 20 rotates (S200). That is, when the drawer moving command is received, electric power is applied to the drive motor 20 to rotate the drive motor 20 clockwise or counterclockwise based on the particular moving command.

When the drive motor 20 has been rotating for a predetermined amount of time (S210), the main controller 20 determines if an FG pulse signal is output (S220). In alternative embodiments, it is also possible to detect an FG pulse signal when the drawer moving command is input through the input button 192*a*. Practically, since the predetermined time is relatively short (ms unit), any difference between making such a determination after the predetermined time has elapsed versus right after the command is input is minimal.

When it is determined that no FG pulse signal is output, the controller 810 determines that the drawer 13 has encountered an obstacle, stops the drive motor 20 (S230), and outputs an alarm signal through the alarm unit 830 (S240).

The alarm signal may be output in different ways. For example, when there an obstacle is encountered, the alarm unit 830 may issue an audible and/or a visual alarm signal in the form of an alarm sound and/or an alarm light output one time or periodically at predetermined time intervals. For example, when one minute has elapsed after the initial alarm signal is output, the alarm signal may be consecutively output multiple more times.

In certain instances, an FG pulse signal may not be generated due to, for example, an obstacle positioned between the drawer 13 and the main body, malfunction of the hall sensor 23, or foreign substances inserted in a coupling portion between the pinion 182 and the guide rack 172. absence of an FG pulse signal, the drive motor 20 substantially immediately stops operating to prevent an over-current from flowing to the inverter 861.

However, when it is determined that an FG pulse signal is output, the main controller 810 calculates an FG pulse generation interval T (S250). That is, the main controller 810 calculates a generation interval between a current FG pulse signal and an immediately preceding FG pulse signal to determine the interval T.

The main controller 810 then calculates a mean, or average, generation interval using all of the preceding FG pulse signals but not the current FG pulse signal (S260) to determine if the current FG pulse generation interval (T) is within a normal range (S270).

A relationship between the FG pulse generation interval T and the normal range can be expressed as follows, where $T_M$ is the mean generation interval and dT is a preset error:

$$Tm-dT \leqq T \leqq Tm+dT$$

The lower limit of the normal range is obtained by subtracting the preset error (dT) from the mean generation interval Tm). When the FG signal generation interval T is less than the lower limit (Tm−dT), this means that the RPM of the drive motor 20 is higher than a normal RPM. This may be caused by, for example, a pinion 182 that is idling because it has disengaged from the guide rack 172.

When current keeps flowing to the drive motor 20 an the pinion 182 is not normally rotating and actively engaged with the guide rack 172, the FG signal generation interval T will be out of the normal range. In this situation, the hall sensor 23 mounted on the stator of the drive motor 20 repeatedly rotates at a predetermined angle and returns to an initial position. Then, the hall sensor 23 detects the permanent magnet attached on the rotor of the drive motor 20 to generate a sensor signal (i.e., a pulse). In this state, the number of pulses that are generated by the hall sensor 23 per hour may be greater than the number of pulses that are generated when the drive motor 20 normally rotates.

The upper limit of the normal range is obtained by adding the preset error (dT) to the mean generation interval em). When the FG signal generation interval T is greater than the upper limit (Tm+dT), this means that the RPM of the drive motor 20 is lower than the normal RPM. This may be caused by, for example, an overload of the drive motor 20 due to an excessive amount of storage items received in the storage box 132.

In addition, the moving speed of the drawer 13 may be suddenly reduced by encountering an obstacle during the withdrawal or insertion of the drawer 13.

When it is determined that the FG pulse generation interval T is not within the normal range, the drive motor stops operating (S230) and the alarming signal is output (S240).

When it is determined that the FG pulse generation interval is within the normal range (S270), the main controller 810 determines if the drawer 13 has reached a preset location (S280). If the drawer 13 has reached the preset location, the drive motor 20 stops operating (S290). If the drawer 13 has not reached the preset location, the drive motor 20 keeps rotating and the process is repeated.

According to the above-described method, by analyzing the FG pulse signal generated by the driver IC 862, the existence of an obstacle may be quickly detected as the drawer 13 is moved. It may also be quickly detected whether the drive motor 20 has malfunctioned and/or whether the pinion 182 has disengaged from the guide rack 172. Further, since these situations may be quickly detected without an additional sensor, manufacturing cost may be reduced.

Figure 10:
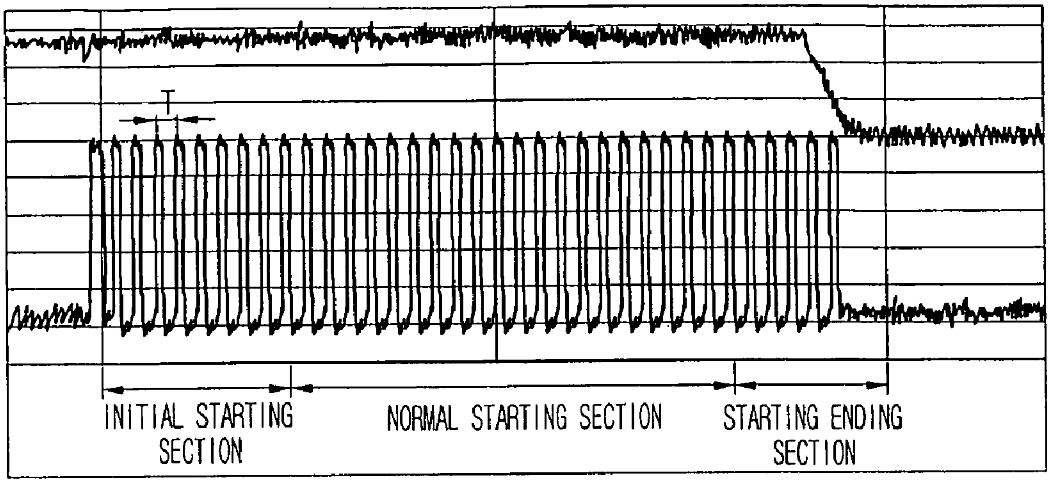
FIG. 10 is a waveform diagram of an FG pulse signal that is generated when a drawer of a refrigerator moves normally.
Figure 11:
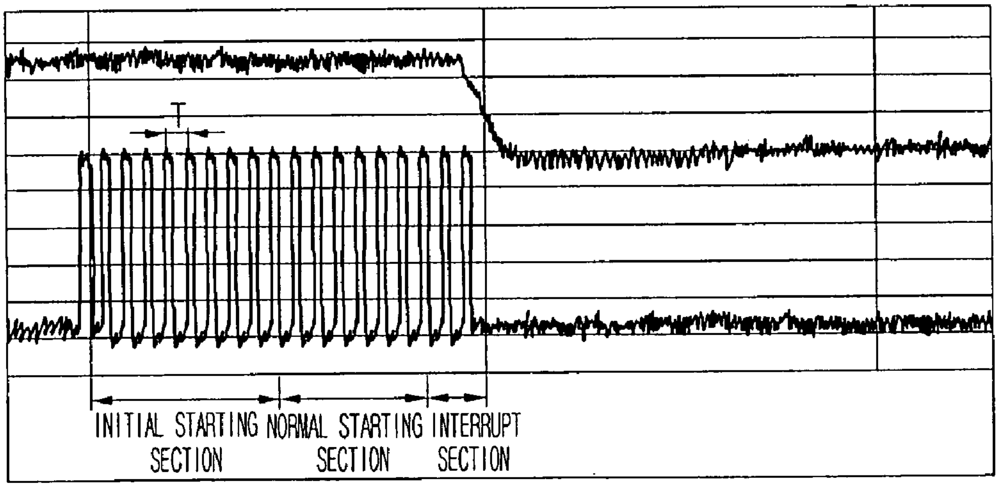
FIG. 11 is a waveform diagram of an FG pulse signal that is generated when a drawer encounters an obstacle as it moves.

FIG. 10 is a waveform diagram of an FG pulse signal that is generated when a drawer of a refrigerator moves normally, and FIG. 11 is a waveform diagram of an FG pulse signal when a drawer encounters an obstacle as it moves.

Referring to FIG. 10, when the drawer 13 moves normally, the FG pulse signal is generated at substantially uniform intervals. Under certain circumstances, the FG signal generation interval T in the initial and ending sections may be slightly greater than the FG signal generation interval T in the normal section. However, as the initial and ending sections are each of a shorter duration than the normal section, the mean FG pulse signal generation interval T is uniform and within the normal range.

In contrast, as shown in FIG. 11, the FG pulse signal generation interval T is suddenly increased in an interrupt section where the drawer 13 has encountered the obstacle while moving. This represents that the RPM of the drive motor 20 has been reduced due to the drawer 13 colliding with the obstacle. As the RPM of the drive motor 20 is reduced, the FG pulse signal generation interval T becomes greater than that in the normal state. In the interrupt section, the FG pulse signal generation interval T is greater than that in the initial and ending sections.

As discussed above, in addition to this method which uses FG pulse signals to detect the drawer moving speed, other methods using a variety of distance detecting sensors, such as, for example, an infrared sensor and an ultrasonic wave sensor, may be used to detect the drawer moving speed.

More specifically, a distance detecting sensor may be mounted at a rear portion of the drawer 13, and a drawer moving distance may be measured by using a time that takes a detecting signal generated by the distance detecting sensor to return after colliding with a rear surface of the inner case of the main body of the refrigerator. A drawer moving distance calculated by the distance detecting sensor and the time that takes the drawer 13 to reach the moving distance may be used to calculate the moving speed of the drawer 13. It is also possible to determine if the drawer 13 is moving normally by detecting variation in speed of the drawer 13 after the drawer withdrawal command is input.

For example, when the drawer moving speed is suddenly reduced, it may be determined that the drawer 13 has encountered an obstacle causing movement of the drawer 13 to stop. On the contrary, when the drawer moving speed is suddenly increased, it may be determined that there may be a problem in the motor 20 or other such malfunction.

Figure 12:
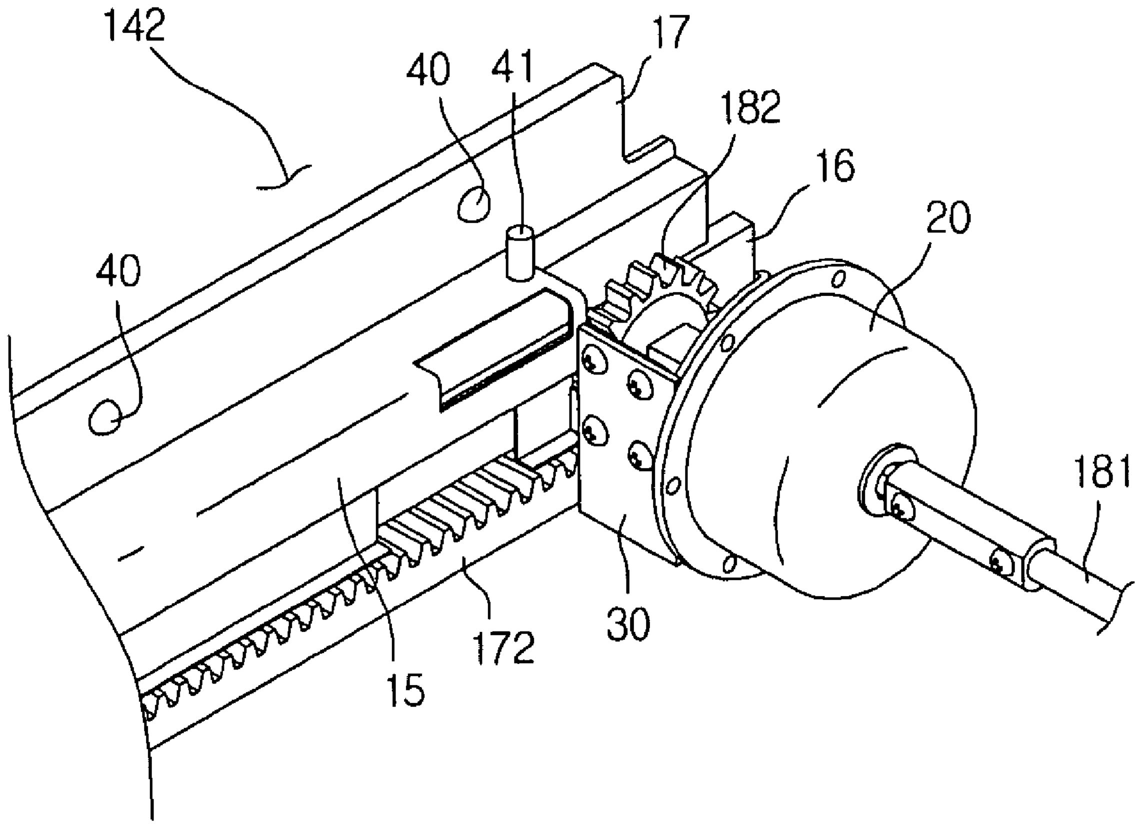
FIG. 12 a partial perspective view of an obstacle detecting structure of a drawer movement unit of a refrigerator according to an embodiment as broadly described herein.

FIG. 12 a partial perspective view of an obstacle detecting structure of a drawer movement apparatus for a refrigerator according to an embodiment as broadly described herein.

A plurality of detecting sensors 40 may be mounted on the rail guide 17 at predetermined intervals. Alternatively, the detecting sensors 40 may be mounted on a side surface of the inner case 142. An object 41 to be detected may be mounted on, for example, the drawer 13 or an appropriate side surface of the drawer movement apparatus, as long as the object 41 moves together with the drawer 13 and the detecting sensors 40 remain fixed relative to the main body of the refrigerator 10 so that an interruption in the movement of the drawer, due to an obstacle, can be detected in the course of moving the drawer 13. The object 41 to be detected may be, for example, a magnet that generates a magnetic force and the detecting sensors 40 may be, for example, hall sensors that detect the magnetic force generated by the object 41. Other types of detecting sensors and objects may also be appropriate.

Further, mounting locations of the detecting sensors 40 and the object 41 may be exchanged so that the detecting sensors 40 move together with the drawer 13 and the object 41 remains stationary. Alternatively, one detecting sensor 40 may be mounted on the drawer 13 and a plurality of objects 41 to be detected may be mounted on the inner case 142 or the rail guide 17.

Using the above-described structure, if no detecting signal is output by the sensors 41, even after a predetermined time has elapsed after the drawer 13 has started to move, and the sensors 40 should have encountered the object 41 if the drawer 13 were moving normally, it can be determined that there is a problem in moving the drawer 13.

Figure 13:
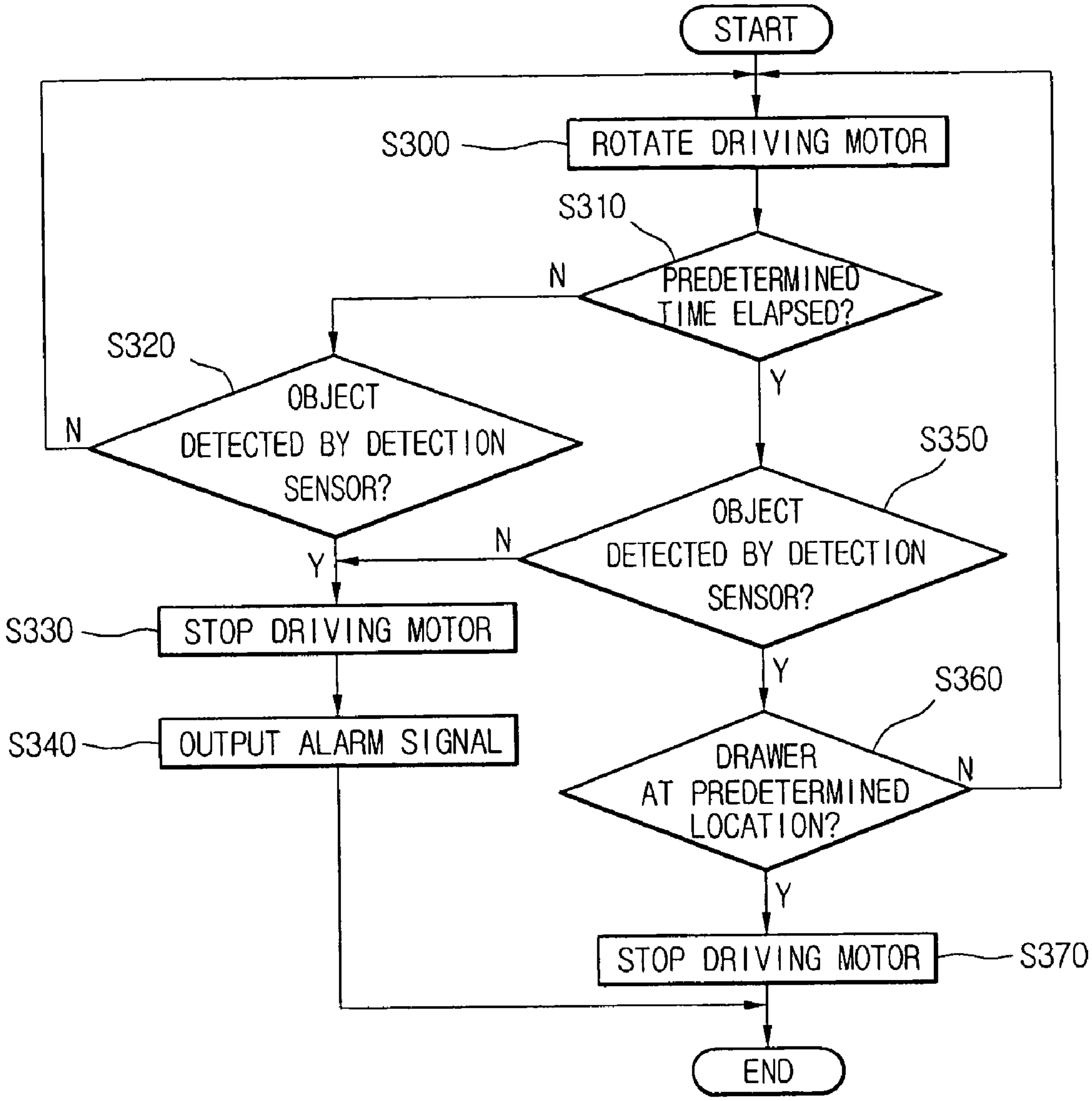
FIG. 13 is a flowchart of a method for driving a drawer of a refrigerator according to another embodiment as broadly described herein, which uses a sensor unit shown FIG. 12.

FIG. 13 is a flowchart of a method for driving a drawer of a refrigerator using a sensor unit as shown in FIG. 12.

First, the drive motor 20 starts rotating when the input unit 840 receives a movement command through user manipulation of the input button 192*a* or the user pushing or pulling the drawer 13 (S300). Data on the location at which the drawer 13 has stopped and on locations at a plurality of times from a point at which the drawer 13 started moving may be stored in the memory 850 of the main controller 810. It is then determined if a predetermined time has elapsed (S310).

Meanwhile, if the predetermined time has not elapsed (S310), it is determined whether a detecting sensor 40 has detected the object 41 (S320). When the detecting sensor 40 detects the object within the predetermined time, the drive motor 20 stops driving (S330) and an alarm signal is output (S340). This may also occur when the drive motor 20 abnormally rotates or the speed control is not normally realized due to the load of the drawer 13.

When the predetermined time has elapsed (S310), it is determined whether the detecting sensor 40 has detected an object 41 (S350). When the detecting sensor 40 has not detected the object 41 even after the predetermined time has elapsed, the drive motor 330 stops driving (S330) and the alarm signal is output (S340). For example, when the drawer 13 collides with an obstacle and thus cannot move, the object 41 is not detected by the detecting sensor 40.

Meanwhile, when the detecting sensor 40 detects the object 41 within the predetermined time (S350), it is determined that the drawer 13 is operating normally. The main controller 810 then determines if the drawer 13 has reached a predetermined location (S360). When the drawer 13 reaches the predetermined location, the drive motor 20 stops driving (S370) and the control process ends. If the drawer 13 has not reached the predetermined location (S360), the drive motor 20 keeps rotating and the process for determining if the object 41 is detected by the detecting sensor 40 is repeated.

Figure 14:
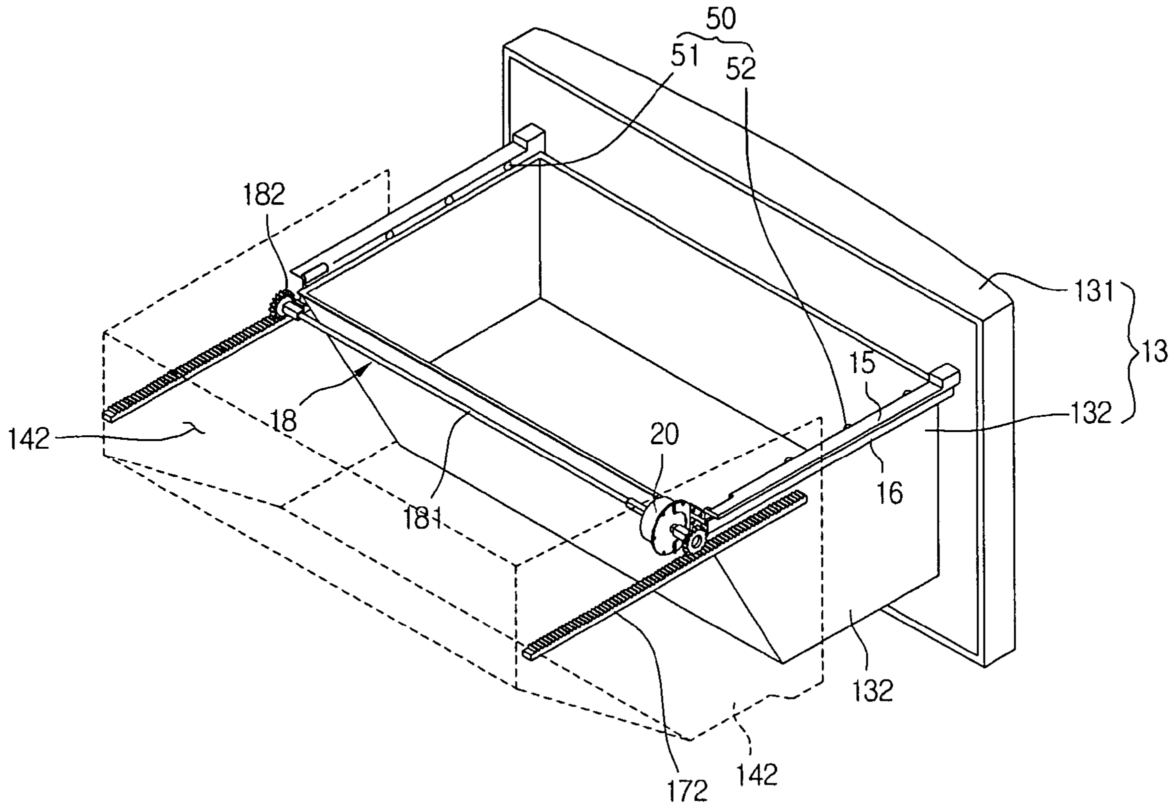
FIG. 14 is a perspective view of an obstacle detecting structure according to another embodiment as broadly described herein.

FIG. 14 is a perspective view of an obstacle detecting structure according to another embodiment as broadly described herein.

When an excess of storage items are received in the storage box 132, the items may partially protrude above an upper end of the storage box 132, possibly preventing the drawer 13 from being smoothly moved. That is, the protruding portion of the storage items may present an obstacle opposing the movement of the drawer 13.

A detecting sensor 50 may be provided on the drawer 13 to prevent the items received in the storage box 132 from presenting an obstacle to the smooth operation of the drawer 13. The detecting sensor 50 may be, for example, a photosensor that emits optical signals, e.g., an IR emitter or a phototransmitter, and may include one or more signal transmission units 51 mounted on a first side of the drawer 13 to emit optical signals, and one or more signal reception units 52 mounted on a second side of the drawer 13 to receive the optical signals. Alternatively, the transmission unit 51 and the reception unit 52, e.g., an IR receiver or a photo receiver, may be respectively mounted on a rear surface of the door 131 and a rear wall of the inner case 142.

In this embodiment, it is determined if the reception unit 52 receives the optical signal emitted by the signal transmission unit 51. When the optical signal received by the signal reception unit 51 is weak, or when some of the signal reception units 51 do not receive a signal, it may be determined that a loading height of the storage items is greater than an allowable height. That is, a portion of the storage items above the allowable height may be the obstacle encountered by the drawer 13. In this instance, no power may be applied to the drive motor 20 or the power may be cut off, and alarm signal may be output through the alarming unit 830.

Additional information regarding refrigerators including this type of storage box structure may be found in related application Ser. Nos. 12/390,520, 12/390,523 and 12/390,524, the entirety of which are incorporated herein by reference.

A storage box type refrigerator is provided that does not requite a handle structure to withdraw a storage box.

A refrigerator is provided that allows for automatic withdrawal of a storage box according to a user's wishes, by means of an improved withdrawing structure for a refrigerator storage box.

A refrigerator is provided with a structure for fixedly installing an improved driving unit that withdraws and inserts a storage box of a refrigerator to minimize reductions in interior storage volume and insulating effectiveness of the refrigerator.

A system and method is provided for driving a drawer of a refrigerator that can always withdraw and insert a storage box at a preset speed regardless of the weight of food stored therein.

A system and method for driving a drawer of a refrigerator is provided which can prevent accidents by immediately stopping a storage box when the storage box encounters an obstacle as it is withdrawn or inserted.

A system and method for driving a drawer of a refrigerator is provided which can prevent the drawer from not being completely inserted due to an excess of storage items received in a storage box of the drawer.

A method of driving a drawer of a refrigerator as embodied and broadly described herein may include transferring a moving signal to a drive motor; detecting an RPM of the drive motor; and determining if the drawer moves to a predetermined location, wherein stopping of the drawer is determined in accordance with an RPM variation of the drive motor.

A drawer driving system of a refrigerator as embodied and broadly described herein may include a drawer for receiving food; an input unit for inputting a moving command of the drawer; a drive motor supplying driving force for moving the drawer; and a controller for controlling driving of the drive motor, wherein the controller determines whether to stop the drawer or not by detecting an RPM variation of the drive motor.

A refrigerator as embodied and broadly described herein may include a main body comprising at least one of a refrigeration compartment remaining at a temperature higher than a freezing temperature and a freezer compartment remaining at a temperature lower than the freezing temperature; an evaporator that is provided in the main body to generate cool air; a compressor for compressing a refrigerant passing through the evaporator; a condenser for condensing the refrigerant passing through the compressor; an expansion member for expanding the refrigerator passing through the condenser at a low temperature/a low pressure; a drawer that is received in one of the refrigeration and freezer compartments and linearly moves; a drive motor for providing driving force for moving the drawer; a detecting unit provided on one of the drawer and a chamber for receiving the drawer; and an object that will be detected by the detecting unit and is provided on the other of the drawer and the chamber.

A method of driving a drawer of a refrigerator as embodied and broadly described herein may include rotating a drive motor; and moving the drawer out of a storage chamber of the refrigerator in accordance with the rotation of the drive motor, wherein it is determined whether to stop the drawer or not in accordance with whether an object is detected by a detecting sensor.

A method of driving a drawer of a refrigerator as embodied and broadly described herein may include rotating a drive motor; and moving the drawer out of a storage chamber of the refrigerator in accordance with the rotation of the drive motor, wherein it is determined whether to stop the drawer or not in accordance with a moving speed variation of the drawer, which is detected by a detecting sensor.

A refrigerator as embodied and broadly described herein may include a main body provided with a storage chamber; an evaporator that is provided in the main body to generate cool air; a compressor for compressing a refrigerant passing through the evaporator; a condenser for condensing the refrigerant passing through the compressor; an expansion member for expanding the refrigerator passing through the condenser at a low temperature/a low pressure; a drawer that is received in the storage chamber to be capable of being withdrawn; a drive motor for providing driving force for moving the drawer; and at least one detecting unit that is provided in the drawer to detect a receiving state of food in the drawer.

A method of driving a drawer of a refrigerator as embodied and broadly described herein may include generating a drawer moving signal; rotating a drive motor in accordance with the drawer moving signal; and operating at least one detecting sensor provided on the drawer, movement of the drawer is restricted in accordance with a received height of food, which is detected by the detecting sensor.

In a movement structure for a storage box of a refrigerator and a refrigerator equipped with such a movement structure the storage box may be automatically withdrawn or inserted, thus providing greater convenience of use. Moreover, because the storage box can be withdrawn automatically, the storage box can be conveniently withdrawn regardless of the weight of food stored in the storage box.

Additionally, a separate handle is not required for withdrawing and inserting a storage box from/into a refrigerator. This allows the external design of the refrigerator to have a clean finish, and the space in which the refrigerator is to be efficiently utilized.

Further, because the drive motor moves together with the storage box, this structure uses a minimal amount of storage space and has a minimal impact on insulative qualities of the refrigerator main body.

Additionally, because the drawer is substantially always withdrawn or inserted at a preset speed regardless of the weight of food stored inside the storage box, reliability of the drawer driving system is increased.

Further, when an obstacle is detected during withdrawal or insertion of the storage box, the drive motor substantially immediately stops operating, and thus a collision between the obstacle and the drawer during the withdrawal or insertion, or the obstacle being caught in the drawer, may be prevented.

Still further, when an excessive amount of storage items are stored in the storage box so as to protrude above a top surface of the storage box, closure of the drawer stops so that the storage items are not damaged during the insertion of the drawer.

Any reference in this specification to "one embodiment," "an embodiment," "example embodiment," "certain embodiment," "alternative embodiment," etc., means that a particular feature, structure, or characteristic described in connection with the embodiment is included in at least one embodiment as broadly described herein. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of operating a drawer of a refrigerator, the method comprising:

- activating a drive motor;
- detecting an RPM of the drive motor, comprising:
  - detecting a current frequency generator (FG) pulse signal generated by rotation of the motor;
  - comparing the current FG pulse signal to a most recent previous FG pulse signal to determine an interval between the current and the most recent previous FG pulse signal;
  - determining if the interval falls within a predetermined range; and
  - determining that the RPM of the drive motor is at a normal RPM if the interval is within the predetermined range, determining that the RPM of the drive motor is greater than the normal RPM if the interval is less than the predetermined range, and determining that the RPM of the drive motor is less than the normal RPM if the interval is greater than the predetermined range; and
- based on the detected RPM, either (1)continuing to move the drawer using the drive motor, or (2) stopping the drive motor such that a movement of the drawer stops.

2. The method of claim 1, further comprising continuing to drive the drive motor and move the drawer until the drawer reaches a predetermined location if the interval is within the predetermined range, and stopping the drive motor and stopping the drawer if the interval is not within the predetermined range.

3. The method of claim 1, wherein a lower limit of the predetermined range is defined by a mean interval, which is a calculated mean of a plurality of previous FG pulse signal intervals, minus a predetermined error value associated with a normal driving of the drive motor and movement of the drawer, and wherein an upper limit of the predetermined range is defined by the mean interval plus the predetermined error value.

4. The method of claim 1, further comprising stopping the drive motor and stopping the drawer if a current FG pulse signal is not detected.

5. The method of claim 1, an alarm signal is output when the motor or the drawer stops.

6. A drawer driving system for a refrigerator, the system comprising:

- a drive motor that supplies a driving force for moving the drawer; and
- a controller that controls operation of the drive motor, wherein the controller receives information corresponding to an RPM of the drive motor and based on the information, the controller stops operation of the drive motor such that the drawer does not move, wherein the controller comprises:
  - a main controller that receives a drawer movement command from the input unit and generates a corresponding driving command; and
  - a motor controller including a driver integrated circuit (IC) that generates a switching signal based on a driving condition of the drive motor and the driving command generated by the main controller, wherein the driver IC receives a frequency generator (FG) pulse from the drive motor as the drive motor rotates, and transmits a corresponding FG pulse signal to the main controller, and wherein the main controller detects the variation in RPM of the drive motor based on the FG pulse signal generated by the driver IC.

7. The system of claim 6, wherein the main controller calculates an interval between a current FG pulse signal and a most recent previous FG pulse signal, and compares the calculated interval to a predetermined range to detect the variation in RPM of the drive motor.

8. The system of claim 7, wherein a lower limit of the predetermined range is defined by a mean interval, which is a calculated mean of a plurality of previous FG pulse signal intervals, minus a predetermined error value associated with a normal driving of the drive motor and movement of the drawer, and wherein an upper limit of the predetermined range is defined by the mean interval plus the predetermined error value.

9. The system of claim 6, further comprising:

- a rolling member provided at a rear portion of the drawer and coupled to a drive shaft of the drive motor so as to rotate in response to rotation of the drive motor;
- a guide member that receives and guides rolling movement of the rolling member so as to guide movement of the drawer.

10. The system of claim 6, wherein the drive motor is a brushless direct current motor provided with a hall sensor, and wherein the drive motor moves together with the drawer and is capable of reverse rotation so as to move the drawer in forward and reverse directions.

11. The system of claim 6, wherein the motor moves together with the drawer.

* * * * *